(12) United States Patent
Numnual et al.

(10) Patent No.: US 7,338,222 B2
(45) Date of Patent: Mar. 4, 2008

(54) APERTURE APPARATUS

(75) Inventors: Phichet Numnual, Chiba (JP); Hisashi Kawamoto, Chiba (JP); Seiichi Oishi, Chiba (JP); Osamu Takano, Chiba (JP)

(73) Assignee: Seiko Precision Inc., Chiba (JP)

( * ) Notice: Subject to any disclaimer, the term of this patent is extended or adjusted under 35 U.S.C. 154(b) by 0 days.

(21) Appl. No.: 11/449,305

(22) Filed: Jun. 8, 2006

(65) Prior Publication Data

US 2006/0250705 A1   Nov. 9, 2006

Related U.S. Application Data

(63) Continuation of application No. PCT/JP2004/017474, filed on Nov. 25, 2004.

(30) Foreign Application Priority Data

Dec. 12, 2003   (JP) .............................. 2003-414950

(51) Int. Cl.
*G03B 9/02*   (2006.01)
(52) U.S. Cl. ..................................... 396/505
(58) Field of Classification Search ............... 396/505, 396/508, 510
See application file for complete search history.

(56) References Cited

U.S. PATENT DOCUMENTS

| | | | | |
|---|---|---|---|---|
| 5,337,110 A | * | 8/1994 | Dowe ........................ | 396/449 |
| 5,930,543 A | * | 7/1999 | Tseng et al. ................ | 396/505 |
| 6,086,267 A | * | 7/2000 | Tsuzuki et al. ............. | 396/459 |
| 6,443,635 B1 | * | 9/2002 | Matsumoto et al. ........ | 396/463 |
| 6,726,380 B2 | * | 4/2004 | Watanabe et al. .......... | 396/463 |

FOREIGN PATENT DOCUMENTS

| | | |
|---|---|---|
| JP | 63-11623 | 1/1988 |
| JP | 11-160752 | 6/1999 |
| JP | 11-194381 | 7/1999 |
| JP | 2001-042384 | 2/2001 |
| JP | 2001-188276 | 7/2001 |
| JP | 2001-215553 | 8/2001 |
| JP | 2002-333657 | 11/2002 |
| JP | 2003-330152 | 11/2003 |

OTHER PUBLICATIONS

International Search Report for PCT/JP2004/017474, dated Dec. 13, 2004.

* cited by examiner

*Primary Examiner*—W. B. Perkey
(74) *Attorney, Agent, or Firm*—Michaud-Duffy Group LLP

(57) ABSTRACT

An aperture apparatus includes a substrate having a lens opening, a first aperture sector having a first aperture opening, a second aperture sector having a second aperture opening, and a drive pin that is engaged in cam openings respectively formed in the first aperture sector and in the second aperture sector and that swings the first aperture sector and the second aperture sector. The first aperture sector and the second aperture sector are located in receding positions from the lens opening, when the drive pin is in an initial position. The cam openings include a swing region and a non-swing region, the swing region guiding a corresponding sector to the lens opening as the drive pin moves from the initial position, the non-swing region retaining the other sector in the receding position, when one of the first aperture sector and the second aperture sector is guided to the lens opening.

8 Claims, 9 Drawing Sheets

FULLY OPEN

FIRST-STEP APERTURE

SECOND-STEP APERTURE

APERTURE APPARATUS

CROSS-REFERENCE TO RELATED APPLICATIONS

This application is a continuation of and claims priority to International Patent Application No. PCT/JP2004/017474 filed on Nov. 25, 2004, which claims priority to Japanese Patent Application No. 2003-414950 filed on Dec. 12, 2003, subject matter of these patent documents is incorporated by reference herein in its entirety.

BACKGROUND OF THE INVENTION

1. Field of the Invention

This invention generally relates to aperture apparatuses for use in optical apparatuses, and more particularly, to an aperture apparatus suitable for use in an optical apparatus such as a digital camera, camcorder, or the like.

2. Description of the Related Art

Conventionally, there have been proposed aperture apparatuses mounted on cameras. It is well known that an aperture apparatus includes multiple aperture blades driven by a drive ring to realize a multi-step aperture mechanism of five or more steps. It is also well known that an aperture apparatus that realizes a given small aperture state by shielding a lens opening with a small aperture blade having a small aperture opening. The aperture apparatus having the drive ring generally has a complex structure, and tends to be large in size. Therefore, it is used for a high-grade camera. However, in these years, low-cost cameras and digital cameras are widely used. For this reason, there is a rising demand for the aperture apparatus whose aperture mechanism is limited to two to four steps, structure is simple, and size is further reduced.

As disclosed in Japanese Patent Application Publication No. 2001-188276 (hereinafter, referred to as Patent Document 1), for example, the aperture apparatus is downsized by reducing and limiting the number of aperture steps. In the aperture apparatus disclosed in Patent Document 1, two small aperture blades having different small aperture openings are swingablly located. Then, a drive pin selectively drives the two small aperture blades to shield the lens opening and form a fully open state, a first small aperture state, and a second small aperture state. Such aperture apparatus is capable of forming two steps of the small aperture state.

The aperture apparatus disclosed in Patent Document 1, however, utilizes the drive pin only for moving the aperture blades to a lens opening position. Accordingly, a return spring is also provided to return the aperture blades to a waiting position (or receding position). Also, a stop position deciding pin is provided so that the aperture blade to which a biasing force is applied may stop at a given waiting position. With the afore-described configuration, the biasing force of the return spring is always working on the aperture blade. So, it is needed to employ a large actuator that drives the drive pin in consideration of the load. In addition, the stop position deciding pin (stop position deciding member) has to be provided at the waiting position to stop the aperture blade, thereby increasing the number of components.

SUMMARY OF THE INVENTION

It is therefore an object of the present invention to address the above-described circumstances and provide an aperture apparatus having a simpler structure that can swing small aperture sectors in an efficient manner.

According to one aspect of the present invention, there is provided an aperture apparatus including: a substrate having a lens opening; a first small aperture sector having a first small aperture opening and a second small aperture sector having a second small aperture opening to shield the lens opening and change a small aperture state; and a drive pin that is engaged in cam openings respectively formed in the first small aperture sector and in the second small aperture sector and to swing the first small aperture sector and the second small aperture sector. The first small aperture sector and the second small aperture sector may be located in receding positions from the lens opening, when the drive pin is in an initial position; and the cam openings respectively formed in the first small aperture sector and in the second small aperture sector may respectively include a swing region and a non-swing region, the swing region guiding one of the first small aperture sector and the second small aperture sector to the lens opening as the drive pin moves from the initial position, the non-swing region retaining the other sector in the receding position, when the one of the first small aperture sector and the second small aperture sector is guided to the lens opening.

According to the present invention, when the first small aperture sector shields the lens opening by means of the cam openings respectively provided in the first small aperture sector and the second small aperture sector, the second small aperture sector is retained in the receding position. In a similar manner, when the second small aperture sector shields the lens opening by means of the cam openings respectively provided in the first small aperture sector and the second small aperture sector, the first small aperture sector is retained in the receding position. It is therefore possible to form different aperture states with certainty by swinging the first small aperture sector and the second small aperture sector without using a return spring. In addition, one of the first small aperture sector and the second small aperture sector can be retained in the receding position, thereby eliminating the necessity of a stop position deciding member. This can promote downsizing.

According to another aspect of the present invention, there is provided an optical apparatus having the above-described aperture apparatus.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given of two embodiments, namely, first and second exemplary embodiments of the present invention, with reference to the accompanying drawings.

Figure 1:
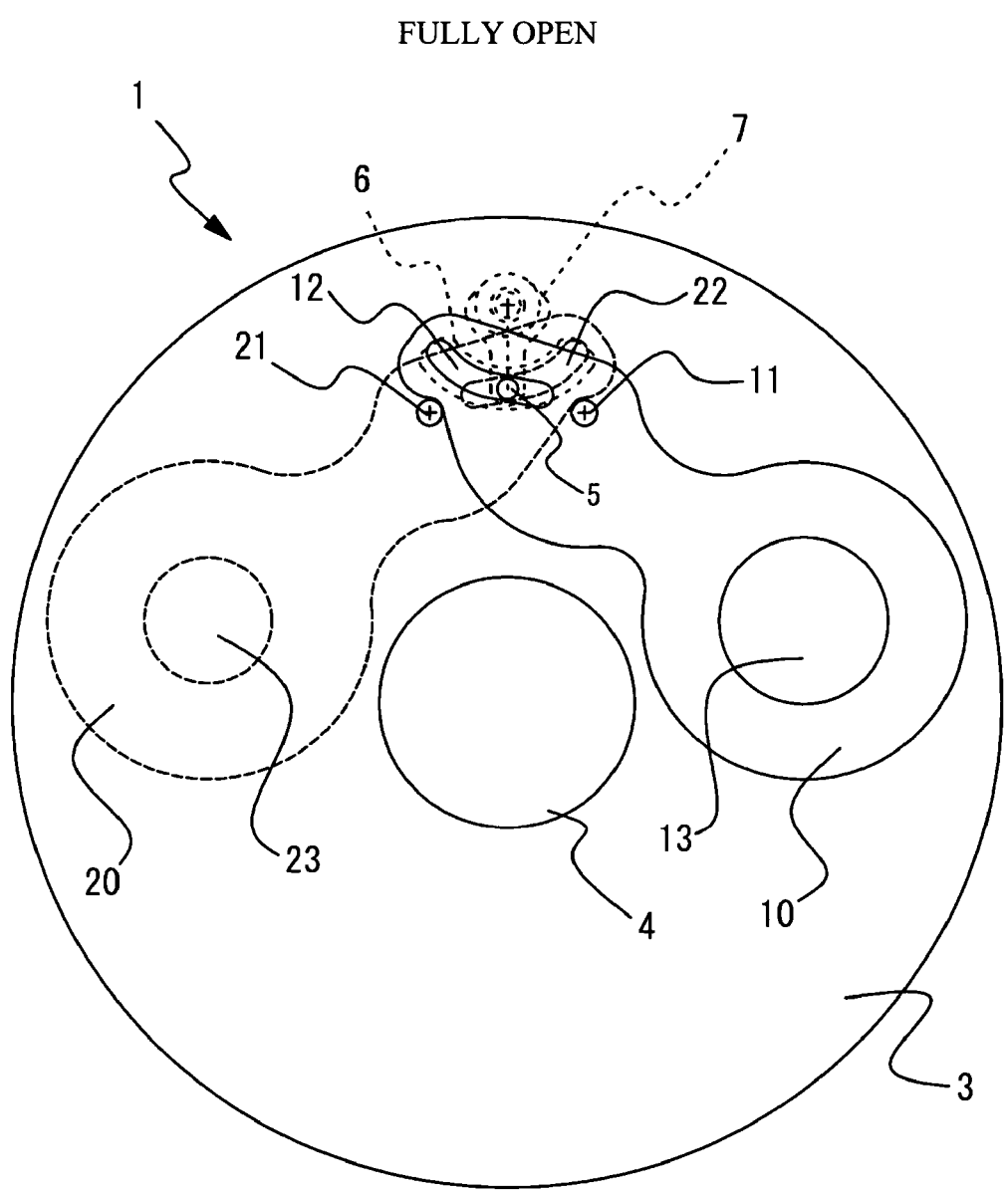
FIG. 1 is a view illustrating an aperture apparatus in a fully open state in accordance with a first embodiment of the present invention.
Figure 2A:
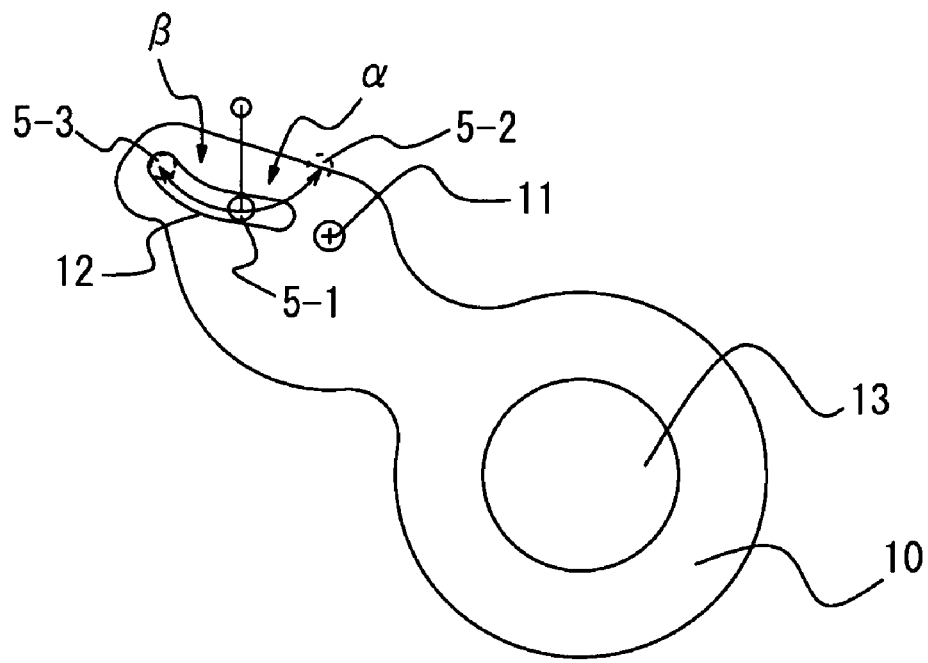
FIG. 2A and FIG. 2B are views illustrating two small aperture sectors included in the aperture apparatus shown in FIG. 1.
Figure 2B:
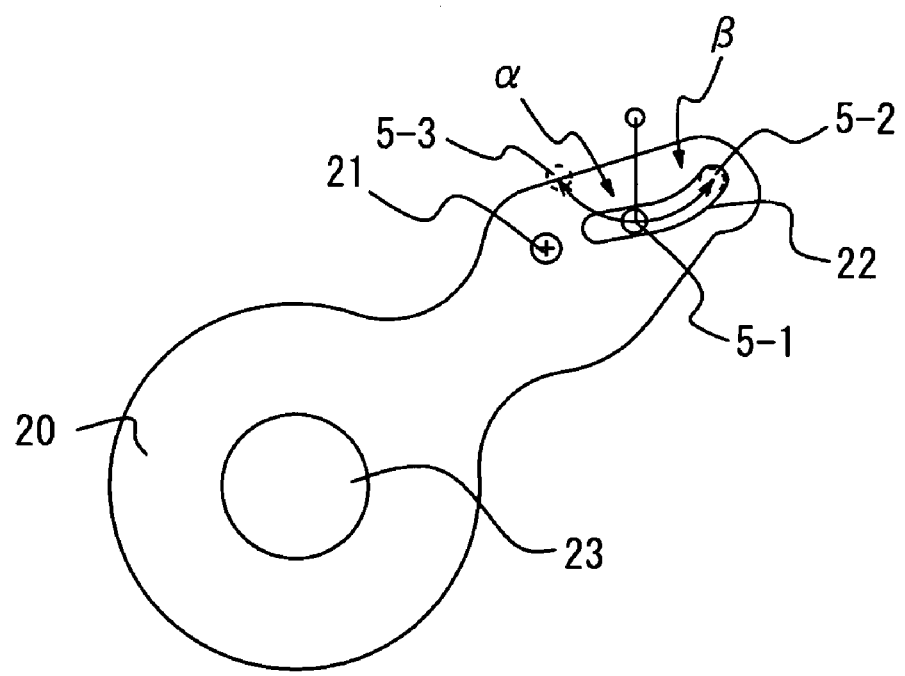
Figure 3:
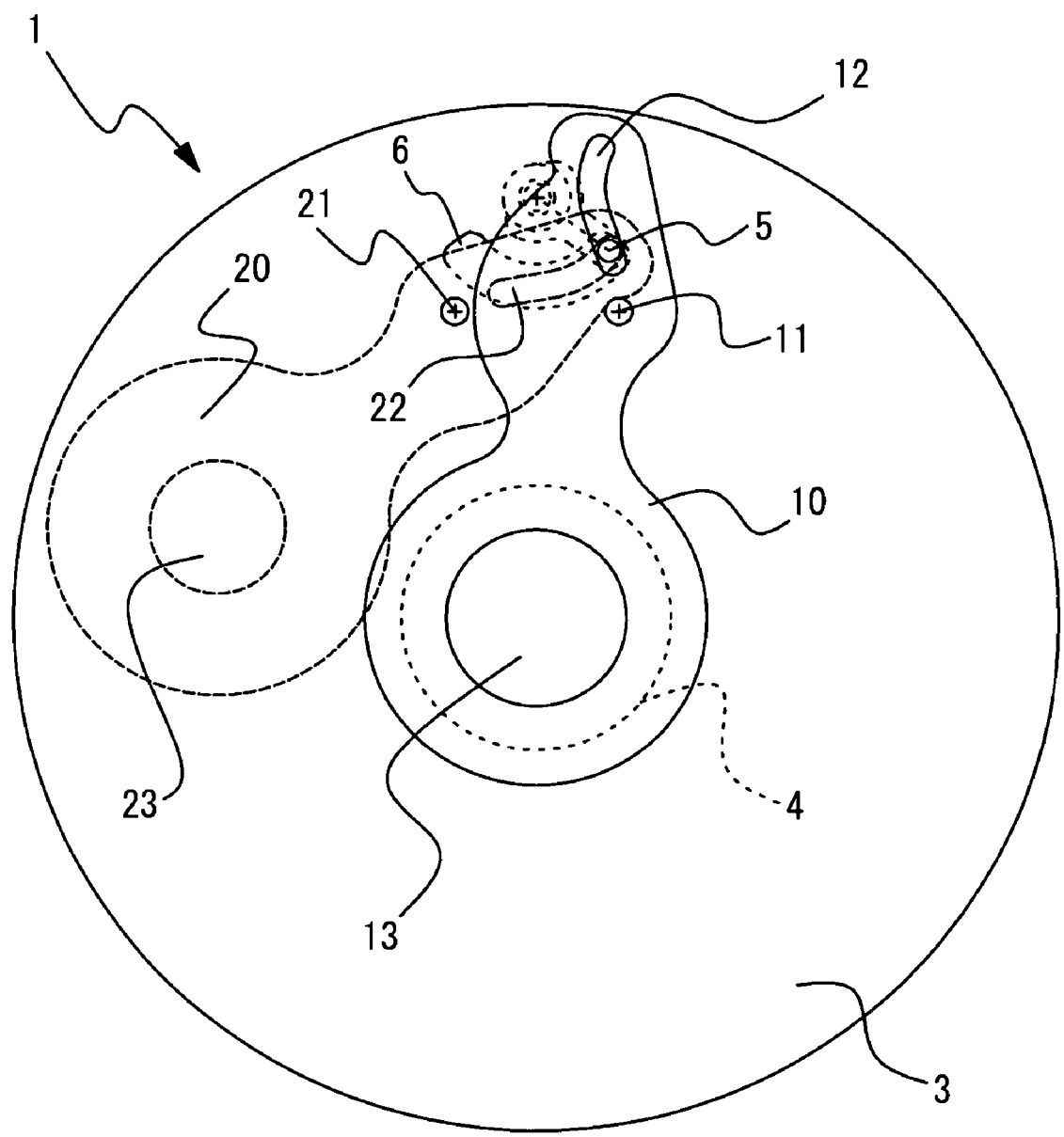
FIG. 3 is a view illustrating the aperture apparatus in a first-step aperture state.
Figure 4:
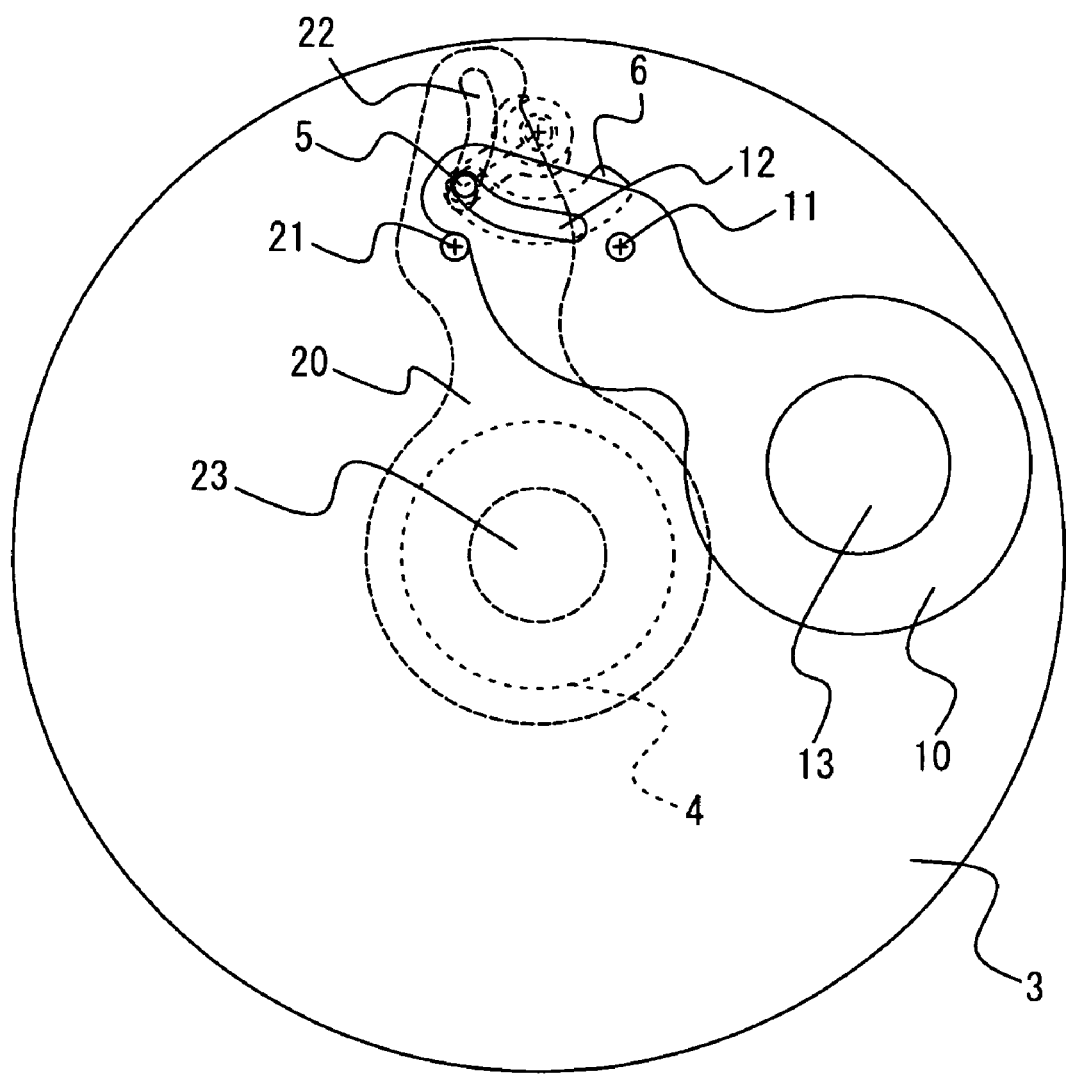
FIG. 4 is a view illustrating the aperture apparatus in a second-step aperture state.
Figure 5:
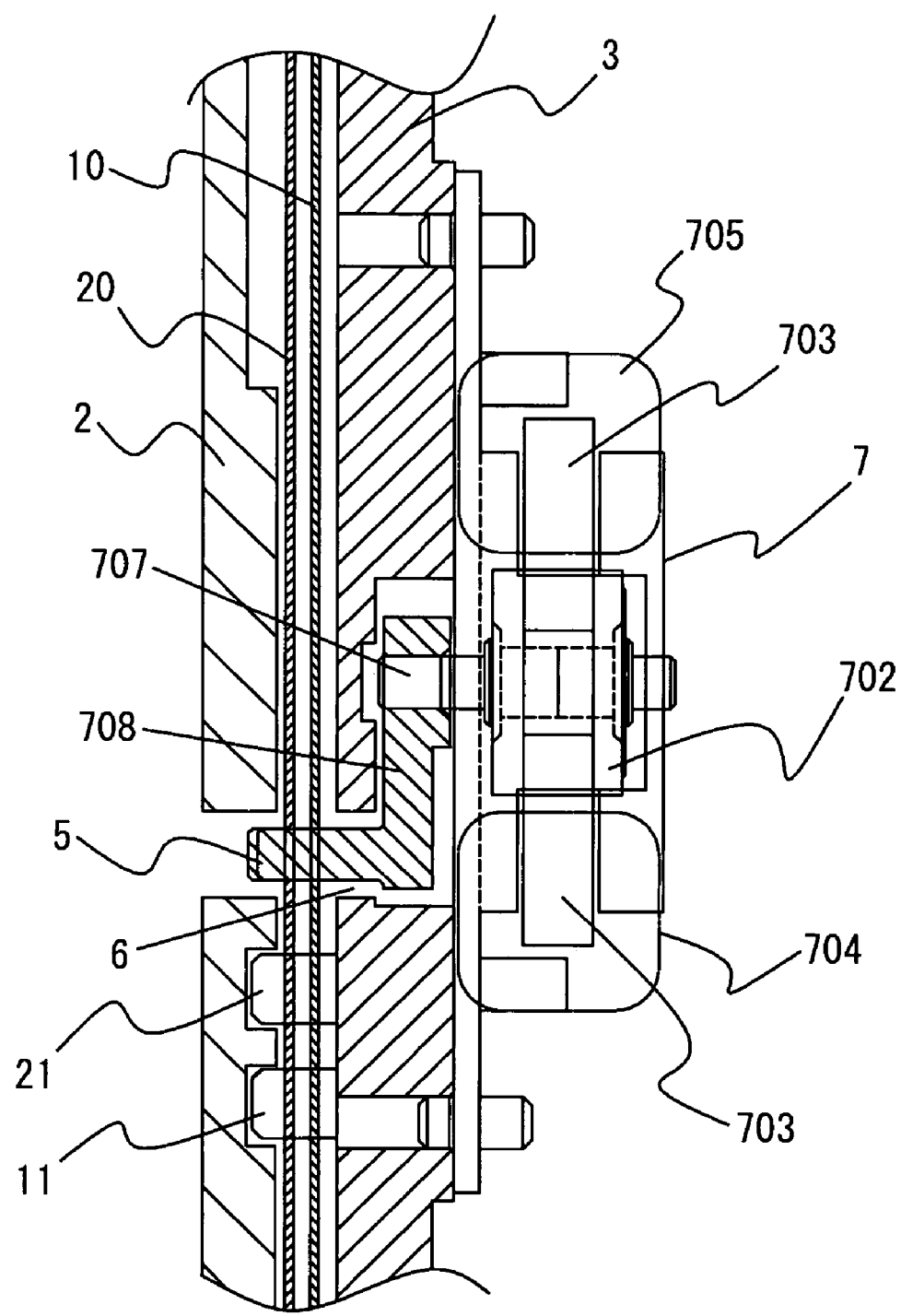
FIG. 5 is a side view showing a positional relationship between a substrate and an actuator included in the aperture apparatus shown in FIG. 1.

FIG. 1 is a view illustrating an aperture apparatus 1 in a fully open state in accordance with a first embodiment of the present invention. FIG. 2A and FIG. 2B are views illustrating two small aperture sectors (small aperture blades) included in the aperture apparatus 1 shown in FIG. 1. In addition, FIG. 3 is a view illustrating the aperture apparatus 1 in a first-step aperture state. FIG. 4 is a view illustrating the aperture apparatus 1 in a second-step aperture state. Further, FIG. 5 is a side view showing a positional relationship between a substrate and an actuator included in the aperture apparatus 1 shown in FIG. 1.

Referring to FIG. 1, the aperture apparatus 1 is provided with a shutter substrate 3 and two small aperture sectors. A first sector 10 is a first small aperture blade having a relatively large-sized small aperture opening 13 (first small aperture opening). A second sector 20 is a second small aperture blade having an aperture opening 23 (second small aperture opening), which is smaller than the small aperture opening 13 of the first sector 10. In FIG. 1, in order to facilitate better understanding, portions relating to the first sector 10 are indicated by solid lines, and portions relating to the second sector 20 are indicated by long-dashed lines.

A lens opening 4 is formed in the center of the substrate 3. When the first sector 10 shields the lens opening 4, a first step of the small aperture state (first-step aperture state) is formed, because the small aperture opening 13 is formed in the first sector 10 (see FIG. 3). When the second sector 20 shields the lens opening 4, a second step of the small aperture state (second-step aperture state) is formed, because the small aperture opening 23 having a different diameter is formed in the second sector 20 (see FIG. 4).

The above-described first sector 10 is provided swingablly around a spindle (swing axis) 11, and includes a cam opening 12 formed in a shape of an elongate opening. The above-described second sector 20 is also provided swingablly around a spindle (swing axis) 21, and includes a cam opening 22. The cam openings 12 and 22 are engaged in a drive pin 5, which swings in a circular trajectory, by a stepping motor 7 (see FIG. 5). That is to say, it is configured in such a manner that one drive pin 5 penetrates two cam openings 12 and 22 and two sectors 10 and 20 are moved to given positions by the movement of the drive pin 5.

FIG. 2A and FIG. 2B are views illustrating the respective sectors 10 and 20 shown in FIG. 1 in order to facilitate better understanding thereof. In these figures, an initial position (5-1) represents the position of the drive pin 5 in the fully open state shown in FIG. 1. In addition, a position (5-2) represents the position of the drive pin 5 in the first-step aperture state shown in FIG. 3. Furthermore, a position (5-3) represents the position of the drive pin 5 in the second-step aperture state shown in FIG. 4. In the aperture apparatus 1, the first-step aperture state is formed when the drive pin 5 rotates counterclockwise, and to the contrary, the second-step aperture state is formed when the drive pin 5 rotates clockwise, with the initial position (5-1) of the drive pin 5 interposed therebetween.

The cam openings 12 and 22 respectively formed in the first sector 10 and the second sector 20 are configured such that when one sector shields the lens opening 4, the other sector remains to stay in a receding position from the lens opening 4. In other words, the first sector 10 and the second sector 20 included in the aperture apparatus 1 respectively have the cam openings 12 and 22, which respectively guide the sectors 10 and 20 or remain to stay in the receding positions when bearing no relation to the aperture state. Here, the receding position denotes a position where each of the sectors 10 and 20 recedes not to shield the lens opening 4. In the fully open state shown in FIG. 1, both of the sectors 10 and 20 are located in the receding positions. In the first-step aperture state shown in FIG. 3 or in the second-step aperture state shown in FIG. 4, one sector is located in the position that shields the lens opening and the other sector is located in the receding position from the lens opening.

A description is given of the cam openings 12 and 22 respectively formed in the first sector 10 and the second sector 20, by reference to FIG. 2, FIG. 3, and FIG. 4. Referring to FIG. 2, the cam opening 12 formed in the first sector 10 includes a swing region α and a non-swing region β. The swing region α is provided for guiding the sector 10 to the lens opening 4, when the drive pin 5 moves to the position (5-2) from the initial position (5-1). Contrary to this, the non-swing region β is provided for retaining the sector 10 in the above-described receding position, when the drive pin 5 moves to the position (5-3) from the initial position (5-1) to guide the second sector 20 to the lens opening 4.

The first sector 10 shown in FIG. 2A is in the fully open state shown in FIG. 1. From this state, the drive pin 5 moves to the position (5-2) and the first-step aperture state is formed as shown in FIG. 3. Focusing on the first sector 10 of this time, the drive pin 5 moves to the swing region α side in the cam opening 12. When the drive pin 5 reaches the end thereof and is brought into contact therewith, the first sector 10 rotates around the spindle 11 clockwise. In contrast, the second sector 20 does not change the position thereof in FIG. 1 or FIG. 3.

As stated, the first sector 10 swings, when the drive pin 5 moves to the position (5-2) from the initial position (5-1). However, the non-swing region β is provided in the corresponding portion in the cam opening 22 of the second sector 20 shown in FIG. 2B. The non-swing region β is formed in a circular shape along the trajectory of the drive pin 5. Therefore, even if the drive pin 5 moves to the position (5-2) from the initial position (5-1), no force (load) is applied to the second sector 20 by the drive pin 5. That is to say, the second sector 20 is retained in an identical position. Accordingly, in the first-step aperture state shown in FIG. 3, it is configured such that only the first sector 10 is moved to the position that shields the lens opening 4 and the second sector 20 is retained in the receding position.

The cam opening 12 of the first sector 10 and the cam opening 22 of the second sector 20 are substantially provided in line symmetry. In the second-step aperture state shown in FIG. 4, an opposite relationship is formed. That is to say, when the drive pin 5 moves to the position (5-3) from the initial position (5-1), the second sector 20 rotates around the spindle 21, and shields the lens opening 4 as shown in FIG. 4. On the other hand, even if the drive pin 5 moves to the position (5-3) from the initial position (5-1), the drive pin 5 does not apply the force (load) to move the first sector 10. Accordingly, in the second-step aperture state shown in FIG. 4, only the second sector 20 moves to the position that shields the lens opening 4 and the first sector 10 is retained in the receding position, contrary to the first-step aperture state shown in FIG. 3. Also, after the first-step aperture state shown in FIG. 3 and the second-step aperture state shown in FIG. 4 are formed, the drive pin 5 is reversely driven to return to the fully open state shown in FIG. 1.

As stated heretofore, when one sector shields the lens opening 4, the other sector is retained in the receding position in the aperture apparatus 1 employed in the first embodiment. In particular, the cam openings formed in both sectors realize the fully open state shown in FIG. 1, the first-step aperture state shown in FIG. 3, the second-step aperture state shown in FIG. 4, and a return operation to the state shown in FIG. 1 from the states shown in FIG. 3 and FIG. 4. That is, the aperture apparatus 1 eliminates the necessity of the conventionally employed return spring that returns the sector to the initial position and the stop position deciding member that regulates the stop position. It is therefore possible to simplify the structure of the aperture apparatus, as compared to the conventional one, thereby enabling the sectors to be swung with certainty.

A description is now given to a more preferable improved example so as to retain the first sector 10 and the second sector 20 in the receding positions with more certainty. As described heretofore, the first sector 10 and the second sector 20 can be guided to the lens opening 4 and retained in the receding positions by the respective cam openings 12 and 22 thereof. The spindles 11 and 21 can be utilized to retain the sectors in the receding positions with more certainty.

As shown in FIG. 1, an end portion of the first sector 10 is so formed as to come into contact accurately with the spindle 21 of the second sector 20, when the first sector 10 is in the receding state from the lens opening 4. In a similar manner, an end portion of the second sector 20 is so formed as to come into contact accurately with the spindle 11 of the first sector 10, when the second sector 20 is in the receding state from the lens opening 4. In this improved example, the spindle of one sector also serves as a supplementary stop position deciding member of the other. It is therefore possible to realize the structure in which the sectors 10 and 20 can be stopped in given positions with certainty without increasing the number of components.

Referring now to FIG. 5, a brief description is given of the structure that drives the sectors 10 and 20 in the aperture apparatus 1. FIG. 5 is a side view showing a positional relationship between a substrate and an actuator included in the aperture apparatus 1 shown in FIG. 1. The stepping motor 7 includes a rotor 702 and a U-shaped stator 703. The stator 703 is provided on the outer side of the rotor 702. Two coils 704 and 705 are wound around the stator 703. The coils 704 and 705 are controlled to be driven by a control circuit, not shown.

The substrate 3 is provided with the lens opening 4, yet the lens opening 4 is not shown in FIG. 5. The two sectors 10 and 20 are arranged on a front surface side of the substrate 3 along the substrate surface. Those sectors are the first sector 10 and the second sector 20, the first sector 10 being provided closer to the substrate 3 than the second sector 20. The stepping motor 7 is provided on the backside of the substrate 3.

The first sector 10 is provided with an opening engaged in the spindle 11 provided on the substrate 3, and is also provided with the cam opening 12 engaged in the drive pin 5 connected to a rotor axis 707 of the stepping motor 7. In a similar manner, the second sector 20 is provided with an opening fit in the spindle 21 provided on the substrate 3, and is also provided with the cam opening 22 engaged in the drive pin 5. The sectors 10 and 20 respectively swing in individual trajectories as the drive pin 5 moves.

An arm portion 8 that extrudes in a radial direction is connected to the rotor axis 707 of the stepping motor 7 provided on the backside of the substrate 3. The drive pin 5 is connected to an end portion of the arm portion 8, and extends to an opposite side through a fan-shaped opening 6 provided on the side of the substrate 3 (see FIG. 1). The cam opening 12 and 22 respectively provided in the sectors 10 and 20 are engaged with the drive pin 5 that extrudes on the front surface side. Accordingly, when the rotor axis 707 of the stepping motor 7 rotates, the drive pin 5 moves in accordance with the rotation. Then, the sectors 10 and 20 swing in given trajectories, and the states shown in FIG. 1 (fully open state), in FIG. 3 (first-step aperture state), and in FIG. 4 (second-step aperture state) can be formed.

Now, by reference to FIG. 6 through FIG. 9, a description is given of an aperture apparatus 50 employed in a second embodiment. The sectors 10 and 20 described in the first embodiment are capable of forming the small aperture state by shielding the lens opening 4 independently, as shown in FIG. 3 and FIG. 4. That is to say, the sectors 10 and 20 respectively have a sufficient width (area) around the small aperture openings 13 and 23. In order to downsize the aperture apparatus, it is needed to reduce the sector area in order to reduce the area of the substrate 3. However, if the sector is formed small, this produces a portion (unshielded portion) where the lens opening 4 cannot be partially shielded by the portion other than the small aperture opening. The aperture apparatus 50 employed in the second embodiment is the aperture apparatus having complementary sectors that complement the unshielded portion of the sectors.

Figure 6:
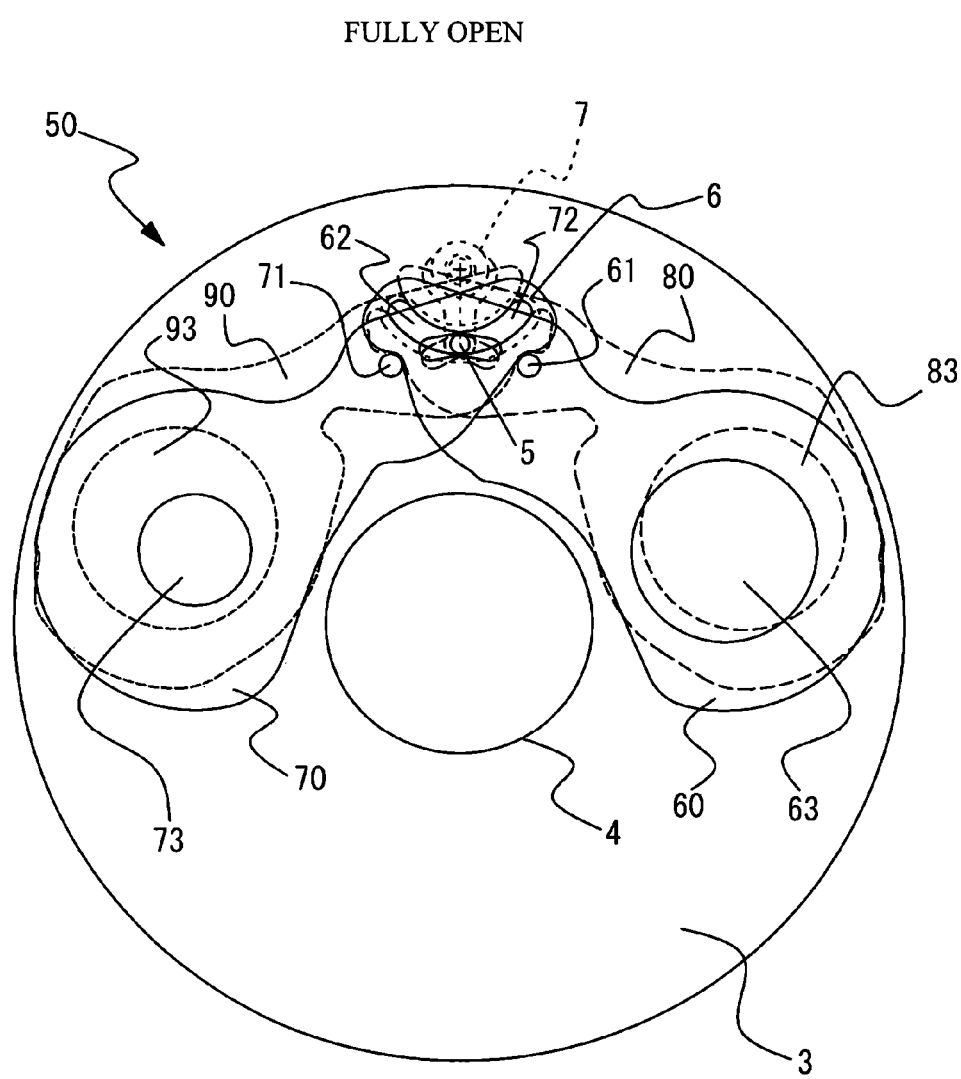
FIG. 6 is a view illustrating the fully open state of the aperture apparatus in accordance with the second embodiment of the present invention.
Figure 8:
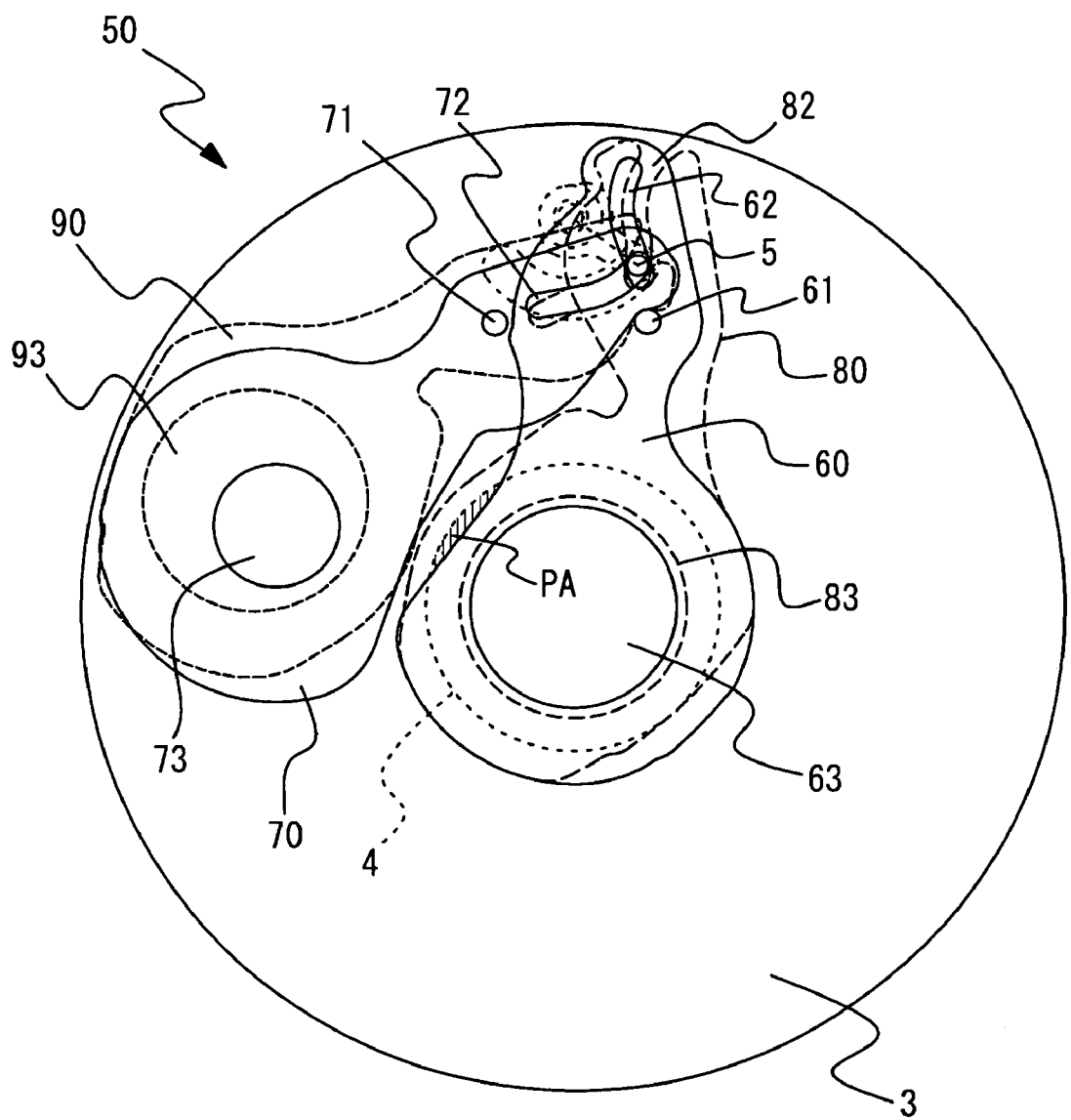
FIG. 8 is a view illustrating the aperture apparatus in the first-step aperture state.
Figure 9:
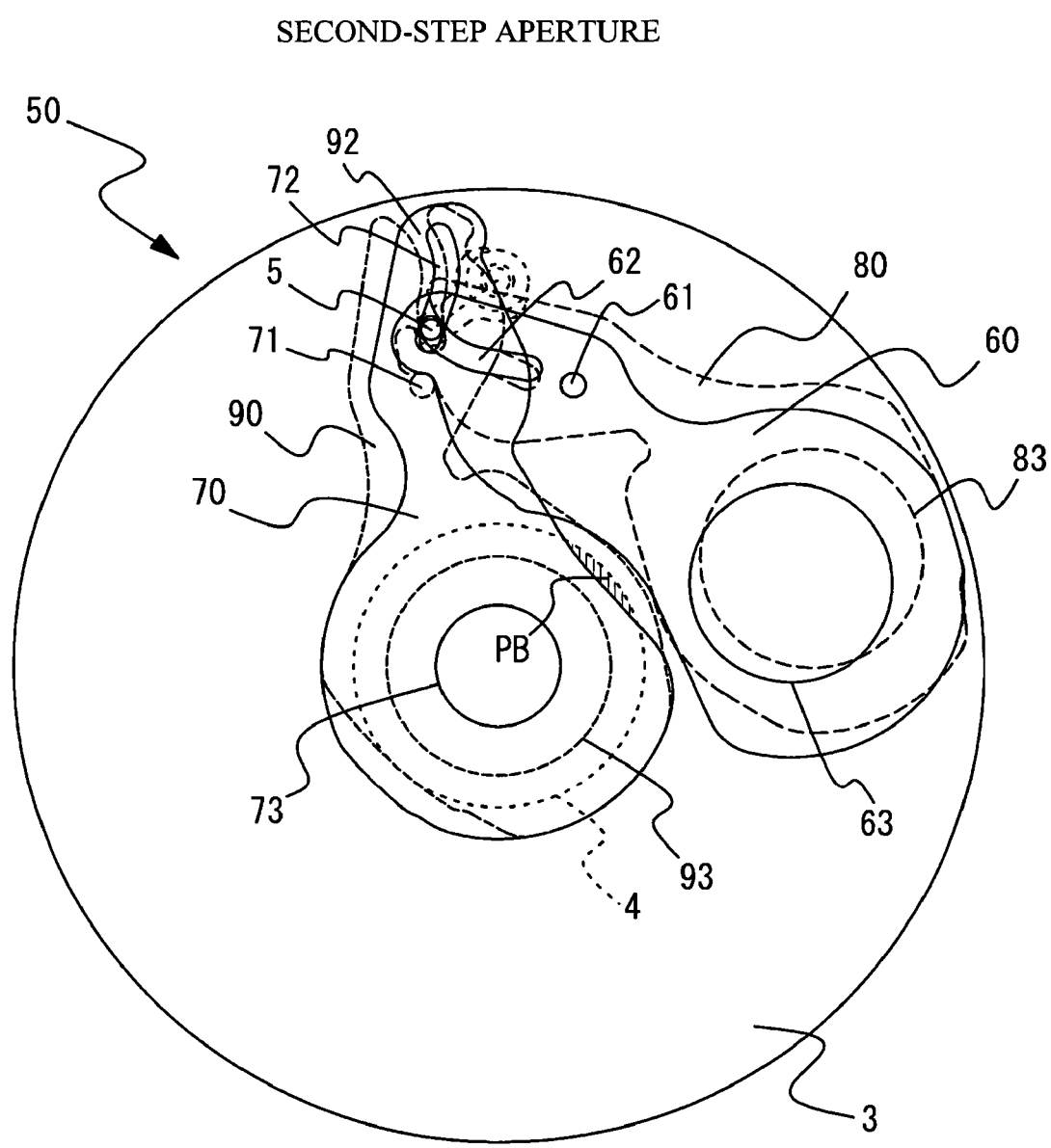
FIG. 9 is a view illustrating the aperture apparatus in the second-step aperture state.

FIG. 6 is a view illustrating the fully open state of the aperture apparatus 50 in accordance with the second embodiment of the present invention. FIG. 7A through FIG. 7D are views illustrating two small aperture sectors (small aperture blades) and two complementary sectors that complement the shielding thereof. In addition, FIG. 8 is a view illustrating the aperture apparatus 50 in the first-step aperture state. FIG. 9 is a view illustrating the aperture apparatus 50 in the second-step aperture state. Hereinafter, in the aperture apparatus 50, the same components as those in the aperture apparatus 1 have the same reference numerals.

The aperture apparatus 50 includes originally provided two small aperture sectors 60 and 70 on the right-hand side and on the left-hand side of the lens opening 4. The first sector 60 is the first small aperture blade having a relatively large-sized small aperture opening 63. The second sector 70 is a second small aperture blade having a small aperture opening 73, which is smaller than the small aperture opening 63 of the first sector 60. In addition, there are also provided a first complementary sector 80 that complements the first sector 60 and a second complementary sector 90 that complements the second sector 70. In FIG. 6, in order to facilitate better understanding, portions relating to the first sector 60 and second sector 70 are indicated by solid lines, portions relating to the first complementary sector 80 are indicated by long-dashed lines, and portions relating to the second complementary sector 90 are indicated by short-dashed lines.

Also in the aperture apparatus 50, the first sector 60 is provided swingablly around a spindle (swing axis) 61, and has a cam opening 62. In a similar manner, the second sector 70 is also provided swingablly around a spindle (swing axis) 71, and has a cam opening 72. The cam openings 62 and 72 are similar to the cam opening 12 and 22 formed in the sectors 10 and 20 in accordance the first embodiment. Accordingly, both of the sectors 60 and 70 are guided to the lens opening 4 independently in accordance with the movement of the drive pin 5. When one of the sectors 60 and 70 shields the lens opening 4, the other sector is retained in the receding position.

Figure 7A:
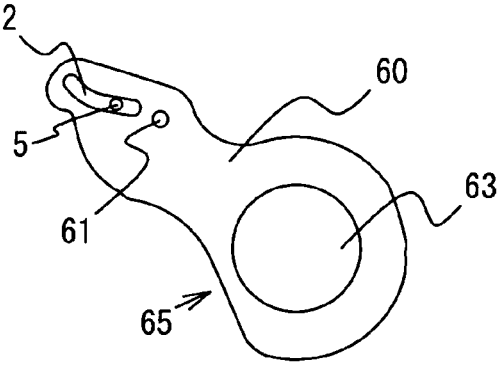
FIG. 7A through FIG. 7D are views illustrating two small aperture sectors and two complementary sectors that complement the shielding thereof.
Figure 7B:
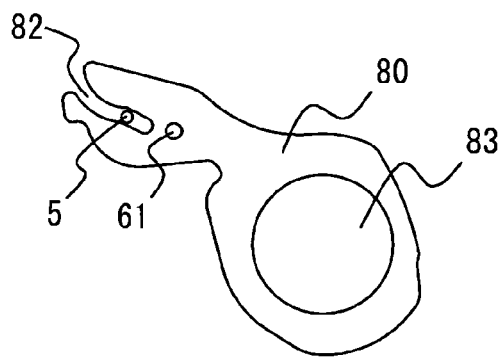
Figure 7C:
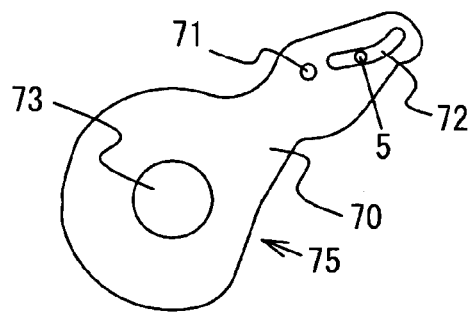
Figure 7D:
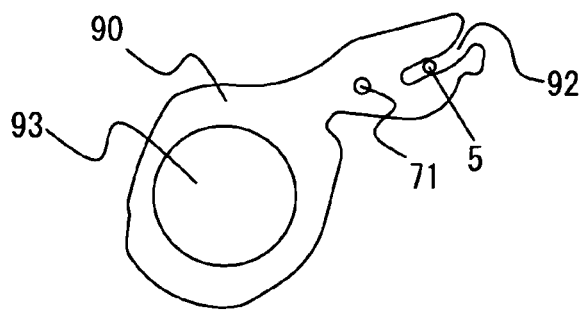

FIG. 7A through FIG. 7D are views illustrating the sectors 60, 70, 80, and 90 in order to facilitate better understanding. FIG. 7A shows the first sector 60. FIG. 7B shows the first complementary sector 80. FIG. 7C shows the second sector 70. FIG. 7D shows the second complementary sector 90. The first sector 60 shown in FIG. 7A and the second sector 70 shown in FIG. 7C are so formed to have smaller widths, as respectively represented by reference numerals 65 and 75, than those of the sectors 10 and 20 employed in the first embodiment. This configuration makes it possible to arrange both of the sectors 60 and 70 closer to the lens opening 4, thereby enabling the whole apparatus to be small-sized. However, referring now to FIG. 8 (the first-step aperture state), there is an area PA that cannot be shielded in the lens opening 4, because the first sector 60 is formed smaller. The first complementary sector 80 shown in FIG. 7B is provided for shielding this area. In a similar manner, referring now to FIG. 9 (the second-step aperture state), there is an area PB that cannot be shielded in the lens opening 4. The second complementary sector 90 shown in FIG. 7D is provided for shielding this area.

The above-described first complementary sector 80 has a shape similar to that of the first sector 60, is provided swingablly around the spindle 61, and stops to shield the unshielded area PA in the first-step aperture state shown in FIG. 8. Accordingly, a cam opening 82 formed in the first complementary sector 80 is also formed to have a shape similar to that of the cam opening 62 in the first sector 60. However, the cam opening 82 is not an elongate opening and has an open end. In addition, as seen in FIG. 7, the first complementary sector 80 is provided with an opening 83 corresponding to the small aperture opening 63 of the first sector 60. This opening is formed so large not to disturb the aperture operation of the aperture opening 63. The second sector 70 and the second complementary sector 90 have the similar relationship as described above, as seen in the second-step aperture state shown in FIG. 9.

The first sector 60 and the second sector 70 in the aperture apparatus 50 are also swung by the cam openings in a similar manner as the sectors 10 and 20 employed in the first embodiment. It is therefore possible to form the fully open state, the first-step aperture state, and the second-step aperture state with certainty, without using the return pin or the stop position deciding member. In addition, the aperture sectors 60 and 70 are formed small, thereby enabling the whole apparatus to be downsized. The complementary sectors 80 and 90 that shield unshielded areas also use the spindles that swing the small aperture sectors 60 and 70. Accordingly, only one drive pin 5 is capable of driving the swing operation, thereby enabling the whole apparatus to be small-sized without complicating the configuration.

The above-described object can be achieved by an aperture apparatus including: a substrate having a lens opening; a first small aperture sector having a first small aperture opening and a second small aperture sector having a second small aperture opening to shield the lens opening and change a small aperture state; and a drive pin that is engaged in cam openings respectively formed in the first small aperture sector and in the second small aperture sector to swing the first small aperture sector and the second small aperture sector. The first small aperture sector and the second small aperture sector may be located in receding positions from the lens opening, when the drive pin is in an initial position; and the cam openings respectively formed in the first small aperture sector and in the second small aperture sector may respectively include a swing region and a non-swing region, the swing region guiding a corresponding sector to the lens opening as the drive pin moves from the initial position, the non-swing region retaining the other sector in the receding position, when one of the first small aperture sector and the second small aperture sector is guided to the lens opening.

According to the present invention, when the first small aperture sector shields the lens opening by means of the cam openings respectively provided in the first small aperture sector and the second small aperture sector, the second small aperture sector is retained in the receding position. In a similar manner, when the second small aperture sector shields the lens opening by means of the cam openings respectively provided in the first small aperture sector and the second small aperture sector, the first small aperture sector is retained in the receding position. It is therefore possible to form different aperture states with certainty by swinging the first small aperture sector and the second small aperture sector without using a return spring. In addition, one of the first small aperture sector and the second small aperture sector can be retained in the receding position, thereby eliminating the necessity of a positioning member. This can promote downsizing.

In the above-described aperture apparatus, the drive pin may be capable of moving to a first position and to a second position provided on both sides of the initial position; and when the drive pin moves to the first position, the first small aperture sector may shield the lens opening to form a first small aperture state, and when the drive pin moves to the second position, the second small aperture sector may shield the lens opening to form a second small aperture state.

In the above-described aperture apparatus, the drive pin may move in a circular trajectory; and the non-swing region may have a shape along the trajectory of the drive pin, and a sector is retained without being moved when the drive pin moves. Such non-swing region can be formed in the cam opening readily. In addition, it may be configured such that a swing axis provided for one of the first small aperture sector and the second small aperture sector serves as a stop position deciding member (positioning member) for the other. Each of the first small aperture sector and the second aperture sector can be stopped at given positions by the cam openings. However, by utilizing the spindle of the other sector to serve as the stop position deciding member, thereby enabling the first small aperture sector and the second small aperture sector to be stopped at desired positions with certainty. Also, the existing members are utilized, thereby eliminating the necessity of another member.

In the above-described aperture apparatus, the first small aperture sector or the second small aperture sector may have a complementary sector to shield a portion that should be shielded to form the lens opening in a small aperture state. In the afore-described case, the first small aperture sector and the second small aperture sector can be small-sized; thereby promoting to downsize the whole apparatus that includes the substrate. The leakage in light shielding caused by downsized small aperture sector can be complemented by the complementary sector, thereby making it possible to complement the functionality as the aperture apparatus. In particular, when the complementary sector is coaxially and swingablly supported by a swing axis provided for one of the first small aperture sector and the second small aperture sector that respectively form the small aperture state and the complementary sector has a cam opening engaged in the drive pin, the complementary sector can be swung in a similar manner as the first small aperture sector and the second small aperture. It is possible to employ the cam opening of the complementary sector includes a swing region and a non-swing region, the swing region guiding the complementary sector to the lens opening as the drive pin moves, the non-swing region retaining the complementary sector in a receding position, when one of the first and second small aperture sectors is guided to the lens opening. In an optical apparatus having the above-described aperture apparatus, the first small aperture sector and the second small aperture sector can be moved with accuracy, thereby enabling a sharp image to be captured.

As described above, the aperture apparatus employed in the present invention is capable of driving aperture sectors with certainty with a simpler structure.

While the preferred embodiments of the present invention have been illustrated in detail, the present invention is not limited to the above-mentioned embodiments, and other embodiments, variations and modifications may be made without departing from the scope of the present invention. In accordance with the above-described exemplary embodiments, the description has been given of the cam openings having a shape of elongate opening and a shape of elongate opening with an open end, as examples of the cam openings respectively formed in the sectors. However, the shape of the cam opening is not limited to them. Basically, the cam opening may be so formed as to form a given cam curve in a portion contact with the drive pin 5, guide the sector to the lens opening, and retain the sector in the receding position.

What is claimed is:

1. An aperture apparatus comprising:
    a substrate having a lens opening;
    a first small aperture sector having a first small aperture opening and a first cam opening;
    a second small aperture sector having a second small aperture opening and a second cam opening; and
    a drive pin that is engaged in the first cam opening and the second cam opening to swing the first small aperture sector and the second small aperture sector,
    wherein the first small aperture opening and the second small aperture opening shield the lens opening and change a small aperture state;
    wherein the first small aperture sector and the second small aperture sector are located in receding positions from the lens opening, when the drive pin is in an initial position;
    wherein the first cam opening and the second cam opening each include a swing region and a non-swing region;
    wherein the swing region is provided for guiding one of the first small aperture sector and the second small aperture sector to the lens opening as the drive pin moves from the initial position and is provided for guiding said one of the first small aperture sector and the second small aperture sector to the receding position as the drive pin moves to the initial position; and
    wherein the non-swing region is provided for retaining the other sector in the receding position, when said one of the first small aperture sector and the second small aperture sector is guided to the lens opening.

2. The aperture apparatus as claimed in claim 1,
    wherein the drive pin is capable of moving to a first position and to a second position provided on both sides of the initial position; and
    wherein when the drive pin moves to the first position, the first small aperture sector shields the lens opening to form a first small aperture state, and when the drive pin moves to the second position, the second small aperture sector shields the lens opening to form a second small aperture state.

3. The aperture apparatus as claimed in claim 1,
    wherein the drive pin moves in a circular trajectory; and
    wherein the non-swing region has a shape along the trajectory of the drive pin, and a sector is retained without being moved when the drive pin moves.

4. The aperture apparatus as claimed in claim 1, wherein a swing axis provided for one of the first small aperture sector and the second small aperture sector serves as a positioning member for the other.

5. The aperture apparatus as claimed in claim 1, wherein the first small aperture sector or the second small aperture sector has a complementary sector to shield a portion that should be shielded to form the lens opening in a small aperture state.

6. The aperture apparatus as claimed in claim 5, wherein the complementary sector is coaxially and swingablly supported by a swing axis provided for one of the first small aperture sector and the second small aperture sector that respectively form the small aperture state, and the complementary sector has a cam opening engaged in the drive pin.

7. The aperture apparatus as claimed in claim 6,
    wherein the cam opening of the complementary sector includes a swing region and a non-swing region;
    wherein the swing region is provided for guiding the complementary sector to the lens opening as the drive pin moves; and
    wherein the non-swing region is provided for retaining the complementary sector in a receding position, when one of the first and second small aperture sectors is guided to the lens opening.

8. An optical apparatus having the aperture apparatus comprising:
    a substrate having a lens opening;
    a first small aperture sector having a second small aperture opening and a first cam opening;
    a second small aperture sector having a second small aperture opening and a second cam opening; and
    a drive pin that is engaged in the first cam opening and the second cam opening and that swings the first small aperture sector and the second small aperture sector,
    wherein the first small aperture sector and the second small aperture sector are located in receding positions from the lens opening, when the drive pin is in an initial position;
    wherein the first cam opening and the second cam opening each include a swing region and a non-swing region;
    wherein the swing region is provided for guiding a corresponding sector to the lens opening as the drive pin moves from the initial position and is provided for guiding the corresponding sector to the receding position as the drive pin moves to the initial position; and
    wherein the non-swing region is provided for retaining the other sector in the receding position, when one of the first small aperture sector and the second small aperture sector is guided to the lens opening.

* * * * *